(12) United States Patent
Illston

(10) Patent No.: US 9,352,421 B2
(45) Date of Patent: May 31, 2016

(54) ADDITIVE MANUFACTURING

(71) Applicant: MATERIALS SOLUTIONS, Worcester (GB)

(72) Inventor: Trevor Illston, Worcestershire (GB)

(73) Assignee: Materials Solutions, Worchester (GB)

(*) Notice: Subject to any disclaimer, the term of this patent is extended or adjusted under 35 U.S.C. 154(b) by 456 days.

(21) Appl. No.: 13/958,971

(22) Filed: Aug. 5, 2013

(65) Prior Publication Data

US 2014/0034626 A1 Feb. 6, 2014

(30) Foreign Application Priority Data

Aug. 6, 2012 (GB) .................................. 1213940.8

(51) Int. Cl.
*B22F 3/105* (2006.01)
*B23K 26/342* (2014.01)
*B23K 26/34* (2014.01)
*B29C 67/00* (2006.01)
(Continued)

(52) U.S. Cl.
CPC ............... *B23K 26/345* (2013.01); *B22F 3/105* (2013.01); *B22F 3/1055* (2013.01); *B22F 3/15* (2013.01); *B23K 26/342* (2015.10); *B23K 35/0244* (2013.01); *B23K 35/3033* (2013.01); *B29C 67/0077* (2013.01); *C22C 19/055* (2013.01); *C22C 19/056* (2013.01); *C22C 19/057* (2013.01); *B22F 3/00* (2013.01); *B22F 2003/248* (2013.01); *Y02P 10/295* (2015.11)

(58) Field of Classification Search
CPC .......... B22F 3/105; B22F 3/00; B23K 26/342
USPC .......... 419/1, 6, 7, 49, 61; 219/121.64, 73.21, 219/76.12; 425/174.4; 264/497; 700/119
See application file for complete search history.

(56) References Cited

U.S. PATENT DOCUMENTS 5,155,324 A    10/1992   Deckard et al.
5,160,822 A * 11/1992   Aleshin ..................... F01D 5/20
                                                                      219/121.64

(Continued)

FOREIGN PATENT DOCUMENTS

CN          1970202 A     5/2007
DE    102009034566 A1    2/2011

(Continued)

OTHER PUBLICATIONS

GB Search Report in Corresponding GB Application No. GB1313492.9 Dated September 24, 2015.

(Continued)

*Primary Examiner* — Samuel M Heinrich
(74) *Attorney, Agent, or Firm* — Volentine & Whitt, PLLC

(57) ABSTRACT

Methods of additive manufacturing a superalloy component are disclosed. In one method a powder bed of superalloy powder is selectively scanned with a focused laser beam in a line-by-line manner; and the spacing between adjacent scan lines is no more than twice the layer thickness being formed. In another method a compressive stress treatment is applied to the surface of the final component prior to separation of said component from the substrate. In a further method a superalloy component is formed on a substrate and the method includes Hot Isostatic Processing of the component wherein the mass of the substrate is reduced prior to the Hot Isostatic Processing. The methods may be combined in a multi-step process.

25 Claims, 3 Drawing Sheets

(51) Int. Cl.
  *B22F 3/15*   (2006.01)
  *C22C 19/05*  (2006.01)
  *B23K 35/30*  (2006.01)
  *B23K 35/02*  (2006.01)
  *B22F 3/00*   (2006.01)
  *B22F 3/24*   (2006.01)

(56) References Cited

U.S. PATENT DOCUMENTS

| | | | |
|---|---|---|---|
| 5,745,834 A | 4/1998 | Bampton et al. | |
| 6,215,093 B1 | 4/2001 | Meiners et al. | |
| 6,676,892 B2 * | 1/2004 | Das | B22F 3/1055 419/7 |
| 2001/0014403 A1 | 8/2001 | Brown et al. | |
| 2002/0015654 A1 | 2/2002 | Das et al. | |
| 2005/0112015 A1 | 5/2005 | Bampton | |
| 2009/0283501 A1 | 11/2009 | Erikson et al. | |
| 2011/0311389 A1 | 12/2011 | Ryan et al. | |
| 2012/0217226 A1 | 8/2012 | Bayer et al. | |

FOREIGN PATENT DOCUMENTS

| | | |
|---|---|---|
| DE | 102010026139 A1 | 1/2012 |
| JP | 10-088201 | 4/1998 |
| JP | 2011089145 A | 5/2011 |
| RU | 2450891 C1 | 5/2012 |
| WO | WO2011050790 A2 | 5/2011 |

OTHER PUBLICATIONS

Mumtaz, Kamran Aamir et al., "High density selective laser melting of Waspaloy," Journal of Materials Processing Technology 194 (2008) 77-87.

* cited by examiner

1. Select raw material powder such that carbon concentration is low within specification range for the final part 2. Select heat scan speed and spacing to create high repetition of short energy pulses 3. Layer-wise building of part on base plate 4. Add compressive stresses to the part 5. Remove substantial base plate mass per part - by cutting into sections and and/or thinning 6. Hot Isostatic Press (HIP) parts on baseplate and inspection 7. Remove remaining base plate from parts and preferably any supports 8. Solution heat treatment 9. Precipitate harden

FIGURE 2

ADDITIVE MANUFACTURING

BACKGROUND

The present invention relates to a method of additive manufacturing a superalloy component.

Additive Manufacturing is a group of processes characterised by manufacturing three-dimensional components by building up substantially two-dimensional layers (or slices) on a layer by layer basis. Each layer is generally very thin (for example between 20 to 100 microns) and many layers are formed in a sequence with the two dimensional shape varying on each layer to provide the desired final three-dimensional profile. In contrast to traditional "subtractive" manufacturing processes where material is removed to form a desired component profile, additive manufacturing processes progressively add material to form a net shape or near net shape final component.

There is a desire to use Additive Manufacturing for the manufacture of superalloy components, for example for the manufacture of aero engine components. Superalloys are alloys which are designed for high performance at elevated temperatures. In particular, superalloys are generally defined as an alloy with excellent mechanical strength and creep resistance at high temperatures. However, the nature of superalloy materials results in several difficulties for additive manufacturing. For example, the high temperature performance of a superalloy is the result of a microstructure that makes them brittle and, therefore, prone to cracking. A number of superalloys are generally considered to be "difficult to weld" (and therefore difficult to form in an Additive Manufacturing process) due their tendency to cracking, in particular nickel superalloys with a high proportion of gamma prime forming elements typically aluminium and titanium are known to be problematic. While the degree of welding difficulty is subjective it is associated in the superalloys principally with their gamma prime hardening elements—aluminium and titanium. As shown in FIG. 1, different alloys may be graphically plotted based upon their compositions of aluminium and titanium. An approximate boundary may be defined between about aluminium 3 wt %+titanium 0 wt % to about aluminium 0 wt. %+titanium 6 wt %; to the right of this boundary alloys may be generally classified as "difficult to weld".

One solution to reduce or avoid cracking during additive manufacture is to maintain the bulk part close to its melting temperature during formation. However, in the case of high temperature materials, such as superalloys, the temperature required is extremely high. The consequence of this is that the equipment is costly and complex, particularly for laser based systems, and the process slowed by the need for heat up and cool down times rendering any such manufacturing process costly and difficult to practice.

An alternative solution has recently been proposed in "Presentation of EC Project FANTASIA; Session 4C: Advanced Manufacturing Technics for Engine Components" pages 31-35, dated 31 Mar. 2011, and presented by Konrad Wissenbach, Fraunhofer Institute for Laser Technology ILT, Aachen, Germany (available at: www.cdti.es/recursos/doc/eventosCDTI/Aerodays2011/4C2.pdf). In this proposal a part is laser powder bed additive manufactured conventionally in Mar-M-247 (a widely used superalloy) resulting in cracks. The cracks formed during the additive manufacturing of the Mar-M-247 component are then treated by pre-heating the whole component to a temperature of 1150° C. (in excess of its operating temperature of 1040° C.) before laser remelting the entire surface of the component. This provides a component having a sealed surface which is then treated by Hot Isostatic Pressing (HIP) and is reported to remove internal cracks and provide a substantially crack free final component. The surface sealing step is required in this proposal, as HIP is only able to collapse fully enclosed cracks.

During HIP processing any gas within crack voids must be placed into solution in the alloy if they are to close. The applicants have identified two potential disadvantages of this process. First, commercially available HIP process have, experimentally, been found to be unable to collapse voids unless the crack is substantially gas free. However, laser based Additive Manufacture typically takes place in a chamber containing a tightly controlled atmosphere of inert gas at close to ambient pressure and therefore purge gas will be present in cracks formed during layer formation. Such cracks will not be closed by a commercial HIP process. As such the proposed method, which already requires additional and potentially costly processing steps, may require layer melting in a vacuum chamber—which is particularly difficult for laser processing as they emit a vapour which covers any window in the vessel to allow the laser to enter. Laser melting processes are therefore generally carried out in a purged environment with gas flow to keep the laser window clear.

Secondly, even if a HIP process is selected capable of putting gas contained in cracks into solution in the alloy, this is not a reliable manufacturing process for a nickel superalloy. It may be expected that this gas will subsequently come back out of solution thereby recreating voids during high temperature operation of that component.

Only cracks formed after solidification (e.g. by a relaxation process) will be reliably closed by HIP processing.

SUMMARY

Thus, there remains a need to provide an additive manufacturing process which ameliorates or removes cracking in superalloy materials.

Accordingly, a first aspect of the invention provides a method of additive manufacturing a superalloy component, the method comprising the steps of:
  i) providing a powder bed of superalloy powder on a substrate;
  ii) scanning the powder with a laser to create a melt pool and there selectively fuse the powder into a desired shape, thereby forming a first layer of the component;
  iii) replenishing the powder bed and scanning the powder with the laser so as to form a subsequent layer of the component onto the first layer; and
  iv) repeating step (iii) as required until the desired three dimensional component is formed;
    wherein scanning the powder with a laser comprises:
      selective scanning of a focused laser beam across the surface of the powder bed in a line-by-line manner; and wherein
      the spacing between adjacent scan lines is no more than twice the layer thickness being formed.

The laser may, for example, be an Ytterbium doped fibre laser.

The method may be carried out at close to atmospheric pressure.

The substrate may be supported by an indexing table. The indexing table is typically arranged to provide a datum and may additionally be movable along a vertical axis such that the substrate may be moved downwardly after each layer is formed (in particular prior to replenishing the powder bed).

It will be understood that scanning in a "line-by-line manner" means that the laser is arranged to scan a first line of the powder bed which extends in a first horizontal direction (for example the x axis) prior to being moved by an incremental distance in a second, perpendicular, horizontal direction (for example the y axis) so as to scan a second line of the powder bed which is parallel to the first line. The second scan line is generally adjacent to and may overlap the first line. This process is repeated until the entire surface of the powder bed has been scanned. Each scan line may extend substantially across the entire width of the powder bed. It will be appreciated that the laser is selectively activated during scanning to fuse only desired portions of each line of the powder bed and thereby provide the desired two-dimensional shape in the layer being scanned.

The scan spacing is preferably arranged so as to provide substantial overlapping of adjacent scan lines. The scan spacing may be approximately 1.5 times the thickness of the layer being formed. The layer thickness is no more than 0.05 mm (50 microns), and may preferably be no more than 0.04 mm (40 microns). Most preferably, the layer thickness is between 0.02 and 0.03 mm (20 to 30 microns). For example, the layer thickness may be 0.02 mm and the scan spacing is 0.03 mm.

The applicants have found that an overlapping scan enables stress reduction to be provided by the subsequent adjacent scan, and may effectively provide a continuously heat treated material. Without being bound by any particular theory, it is believe that this stress relief may be provided via the heating of adjacent material by the heat affected zone adjacent to the melt pool of the subsequent scan. This goes against convention in powder bed metal Additive Manufacture of metallic components as it is generally a commercial requirement to scan at full power (nominal 195 W for a 200 W laser) as quickly as possible with as little overlapping of scanned lines as is consistent with the materials requirement as Additive Manufacturing processes are relatively slow and expensive compared to conventional manufacturing processes such as casting. By way of example, conventional scan spacing in an existing process (using a 200 W laser with a nominal spot size of 0.08 mm) would be approximately 0.1 mm.

It has been found that the method is particularly effective if the scan speed is relatively high, for example greater than 3 m/s or 4 m/s though about 3 m/s appears particularly effective (in comparison to conventional scanning at 1 m/s). The laser dwell time may be less than 40 µs. In particular it has been found that a high speed full power scan produces a more nearly crack free component than a lower speed lower power scan. It is believed that a high scan speed produces a significantly reduced vertical melt pool with only a slight reduction in lateral extent. It is not possible to produce this high aspect ratio melt pool by adjusting the scan power.

The scan spacing may be arranged such that selective scanning of a focused point source of energy across the surface of the powder bed melts the areas of the powder to form a layer followed by at least two remelts of that layer by adjacent scans of the laser beam.

The laser spot size may have a nominal size of no more than 0.1 mm and may for example be approximately 0.08 mm.

The superalloy may be selected to have relatively low carbon content. For example, certain superalloys are commercially available in a low carbon variant. Alternatively or additionally, the superalloy composition may be selected to have a carbon content towards the lower range of the alloy specification.

The method may further comprise the additional step of applying a compressive stress treatment to the final component. The applicants have found that it is particularly advantageous to apply the compressive stress treatment prior to removal of the component from any substrate (base plate) on which the component has been formed. (It will be appreciated that the component is effectively welded to the substrate after additive layer manufacturing and may include additional support structure formed during processing). This reduces the risk of the component undergoing mechanical relaxation prior to compressive stress treatment.

This is considered inventive in its own right and for certain alloys may be beneficial without the scanning approach of the first aspect. Therefore, according to a second aspect the invention provides a method of additive manufacturing a superalloy component, the method comprising:
 i) providing a powder bed of superalloy powder on a substrate;
 ii) scanning the powder with a focused point source of energy to selectively solidifying the powder into a desired shape, thereby forming a first layer of the component;
 iii) replenishing the powder bed and scanning the powder with the focused point source of energy so as to form a subsequent layer of the component onto the first layer; and
 iv) repeating step (iii) as required until the desired three dimensional component is formed;
wherein the method further comprises: applying a compressive stress treatment to the surface of the final component prior to separation of said component from the substrate.

The compressive stress treatment may be by mechanical impact, for example by peening. Alternatively, the compressive stress treatment may be fluid transmitted impact or laser peening. Preferably the component is treated to remove loose powder prior to compressive stress treatment.

The component may be additionally treated by Hot Isostatic Processing, preferably after compressive stress treatment. The Hot Isostatic Processing may be carried out with the component prior to separation of said component from the substrate. Preferably the mass of the substrate is reduced prior to Hot Isostatic Processing.

The method may comprise the additional step of solution heat treatment of the component. The method may comprise the step of precipitate hardening of the component.

Whilst the invention has been described above, it extends to any inventive combination of features set out above or in the following description or drawings. Further, any optional features described above with respect to embodiments of the first aspect of the invention are expressly considered to be equally applicable to the second aspect of the invention and vice versa.

BRIEF DESCRIPTION OF THE DRAWINGS

Specific embodiments of the invention will now be described in detail, by way of example only, and with reference to the accompanying drawings in which:

FIG. 2 is a the process flow according to an embodiment of the invention; and

DETAILED DESCRIPTION OF EMBODIMENTS

Figure 1:
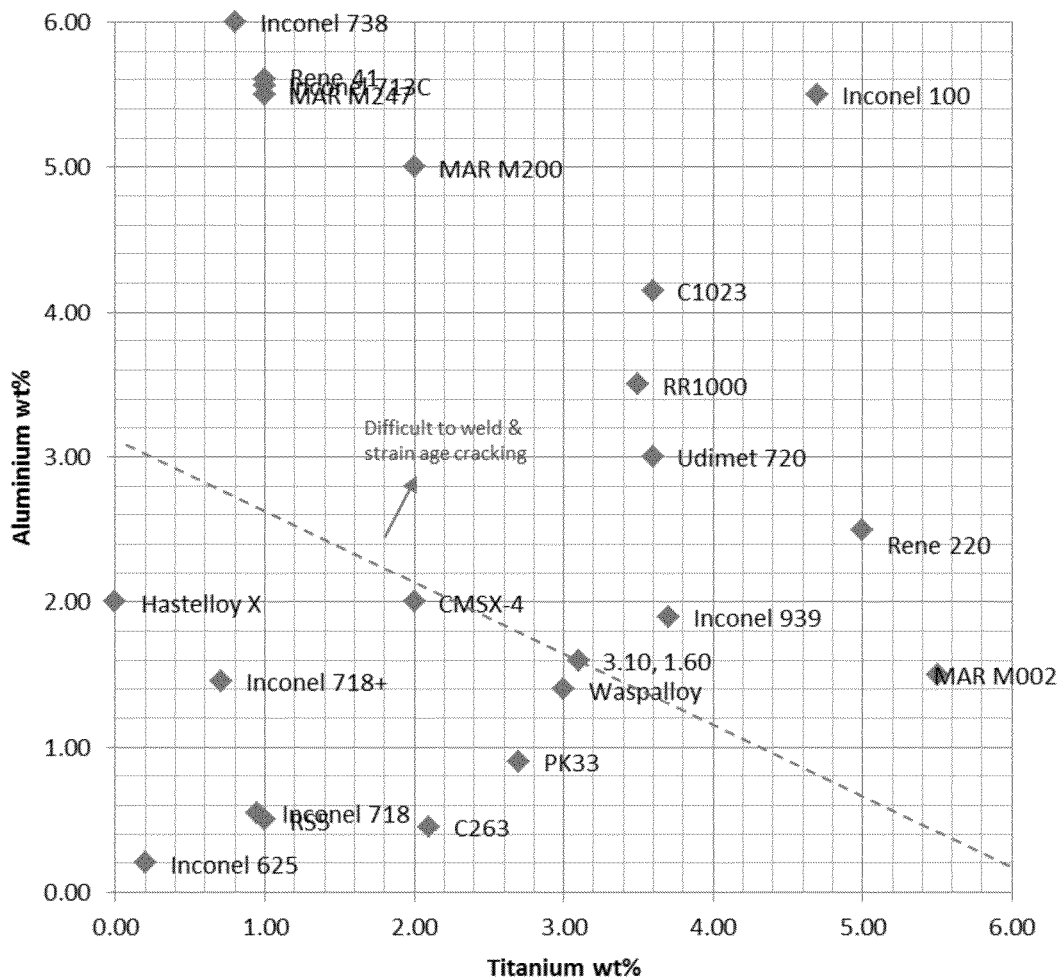
FIG. 1 is a graphical representation of the relative weldability of gamma strengthened superalloys of differing Titanium and Aluminium contents.

The process according to a preferred embodiment is illustrated diagrammatically in FIG. 2. The preferred embodiment uses a power bed Selective Laser Melting process for the layerwise building of the part on a baseplate. Such Selective Laser Melting processes may be practiced in commercially available equipment available under several names, for example in EOS M270 and M280 'DMLS' equipment, Concept Laser M1, M2 and M3 'Cusing' equipment, and the Selective Laser Melting equipment of SLM Solutions and Renishaw (MTT). These commercially available processes work at close to atmospheric pressure since a relatively high gas flow is required to remove metal vapour created during use (and, therefore, it is generally not practical to provide a vacuum at such flow rates). The process—as it is presently operated—is known by many names but is distinguished from 'sintering' in that a high beam quality is used to melt the powder fully to create a nominally fully dense part, whereas previously a sintering of metal powder was only possible with e.g. a $CO_2$ laser thereby creating a part that was less than 99% dense. Each step of the process will now be described in more detail.

Step 1: Carbon Content Selection

The problem the layer based process presents is that the material deposited may be chemically equivalent to the final alloy of the part, but the grain structure associated with the alloy as cast is not present in the alloy as layer deposited. As the layers are deposited—typically at 10 to 100 microns, and preferably at 20 to 40 microns elongate grains are formed vertically through several layers believed to be as a result of the thermal gradient inherent in the process. The purpose of the carbon in the alloy is to form discrete metal carbides at grain boundaries to 'pin' the structure and help form a convoluted path to increase the energy requirement for crack propagation. In the case of the layer process the carbides are formed at high concentrations in lines along the grain boundaries formed on solidification and conversely form chains of fault propagation sites. The carbon concentration of the as-solidified from powder material has therefore been identified as a critical component of the problem to solve and the invention includes a selection of a lower than average carbon content in the range specified for that alloy, or preferably the selection of a low carbon variant of that alloy.

It should be understood that there is great commercial value in being able to process recognised alloys within their specification. Moving elemental composition outside of specified ranges may result in an alloy that builds crack free but may also result in an unrecognised and thus unacceptable alloy.

For example, in the case of alloy MAR M 247 a high strength at elevated temperature casting alloy developed by Martin-Marietta Corporation there is a 'low carbon' variant commercially available from Cannon Muskegon (www.cm-group.com) known as CM247LC (LC—'Low Carbon'). This material is selected in preference to standard MAR M 247 and is widely described and accepted as a 'low carbon' variant of MAR M 247.

The chemical composition of MAR M 247 is nominally 10% Co, 10% W, 8.25% Cr, 5.5% Al, 3.0% Ta, 1.5% Hf, 1.0% Ti, 0.7% Mo, 0.15% C, 0.05% Zr, 0.015% B, and the balance Ni. In the specification for MAR M-247 published by in the Aerospace Structural Metals Handbook Carbon may be in the range 0.13~0.17%. In contrast the chemical composition of CM247LC is nominally 9.5% W, 9.2% Co, 8.1% Cr, 5.6% Al, 3.2% Ta, 1.4% Hf, 0.7% Ti, 0.5% Mo, 0.075% C, 0.015% Zr, 0.015% B, and the balance Ni. Note that the carbon content is much lower at a nominal 0.075% and in the range 0.070 to 0.080%

Step 2: Laser Scan Settings

As the powder bed metal Additive Manufacturing processes are already relatively slow and very costly compared to casting it is a commercial requirement to scan at full power (nominal 195 W for a 200 W laser) as quickly as possible with as little overlapping of scanned lines as is consistent with the materials requirement. Where full melting (substantially no voids) is required a scan speed of approximately 1 meter per second with a scan spacing of 0.1 mm (100 microns) is used on an EOS M270 machine for its 200 W laser with a nominal 80 micron spot size. (Note that neither the melt pool nor the heat-affected zone are exactly the same size as the nominal width of the laser spot).

This prior art process results is a heavily micro cracked and macro cracked part built in CM247LC.

Various experiments were performed to try and minimise this cracking trying various powers, scan speeds and spacings for melting and remelting each layer. It was unexpectedly found that the process yielding the least number of cracks resulted from a fast scanning with considerable overlap to form a layer and without the need to rescan that layer either on a layer by layer basis or after several layers.

This cause of this result is not intuitively obvious and, therefore, an axi-symmetric 2-dimensional mesh model was built to produce pseudo 3-dimensional results to try and explain the observations made. As laser scanning may be considered a pulse of laser energy at any one point this was used in the model as an approximation to a scanning laser across a surface where a dwell time of 80 µs=1 meter per second scan speed.

Without being bound by any particular theory, the applicants were able to produce some observations from these results as to why a fast scan of high power is not, for example, the same as a slower scan at lower power and why a heavily overlapping scan produces the unique results observed.

The laser spot generates a melt pool that behaves non-intuitively and the heating of solid material is principally from the liquid melt pool. Melt-pool radius increases with dwell time, but shrinks back immediately laser power is removed. It is strongly influenced by laser spot radius and has less temporal variation beyond the first 20 µs.

In contrast, the melt pool depth continues to increase beyond the end of the laser dwell time. The stored energy in the melt pool continues to supply heat flow downwards after the laser spot has gone. There is no equilibrium melt-pool depth. As a result the only way to achieve a shallow melt pool is to scan faster—scanning at the same speed with lower laser power level does not achieve the same result. A shallow melt pool may also reduce the level of stress in the solidified material.

The next aspect of a possible explanation for the process requires the understanding that a stress relieving treatment is a solid phase treatment. Every time the metal is melted and solidified it will require a solid phase stress relieving process. Therefore wherever the laser spot is scanned across the surface and achieves a melt—this melted and solidified material will be stressed due to subsequent cooling and solidification.

Figure 3:
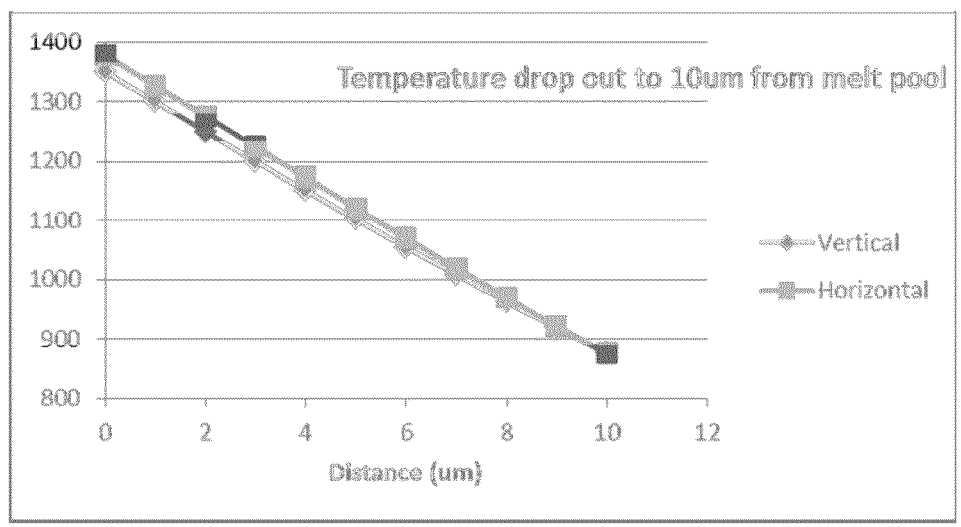
FIG. 3 is a graph of the calculated temperature variation of the work piece in the heat affected zone.

There is, however, a heat affected zone about the melt pool where solid material is heated but not melted. This can be calculated and a diagram is shown as FIG. 3. What this shows us is that a temperature of about 1000° C. is expected around 7 microns from the melt pool. As the melt pool is moved by the laser spot scanning the surface there is a band of solid material beside it being heat treated and not melting. And as these scans are spaced across the surface after each melt pool traverse to form a strip of sold material from powder there is a heat treated band of solid material beside it that is not subsequently melted again for that layer.

The applicants believe that closer spaced scans may provide a continuously heat treated material where conventionally spaced scans—such as 0.1 mm will always leave a band of previously melted material that is not subsequently heated sufficiently to cause a useful stress relief. Similarly, as the layers are built up, one upon another, to form the desired part, there is a remelting of at least part of a previous layer—and a heat affected zone beyond it that may reduce stress.

From the above explanation it can be seen that the complete layer, once made, cannot be laser scanned to heat treat (only—but not melt) to the full depth of the layer and not melt the surface—if that layer thickness is greater than about 10 microns (for a nickel alloy). And for layer thicknesses created by full melting of 20 microns where at least part of an underlying layer must also be melted to achieve a contiguous melt then the heat treating effect beneath the melt pool should extend to a similar depth as the depth of the melt pool. This can only be achieved with a shallow melt pool.

The explanation above is offered as a possible explanation. What is not yet know is the extent to which the experimentally derived process results in a scan by scan heat treatment to stress relieve previously melted material, diminished crack initiation perhaps due to thinner layers being melted and remelted or a remelting and closure of incipient cracking, or a combination of these and perhaps other processes.

Experimentally, for the alloy CM247LC good results (relatively crack-free) have been found for a nominally 200 W laser with a spot size of approximately 80 microns with a scan speed of 3~4 meters per second and scan spacing of 0.02 to 0.03 mm (20~30 microns) forming layers nominally 20 microns thick. Given the nominal laser spot size of 80 microns this may be thought of as a melting and at least two further remelts on a scan by scan basis and a heat treating effect below the melt pool extending to a substantial fraction of the depth of the previous layer thickness. The overlap of scans using an 80 micron spot have ranged from 60% to just under 90% depending on scan spacing and with a 100 micron spot the overlap may extend from around 70% to 90% for scan spacing between 0.03 mm down to 0.01 mm.

Experimental attempts were made at slower scan speeds using progressively lower laser power levels. It can be demonstrated that the laser energy absorption is strongly dependent on a melt pool being created—dramatically increasing the moment a melt pool is created from around 20% for a $CO_2$ laser and about 40% for a YAG laser up to around 100%. Once a melt pool is not sustained laser energy absorption drops dramatically. There is therefore great practical difficulty in applying sufficient laser power to heat treat only (no melting) to any depth (laser energy being absorbed only at the surface unlike e.g. electron beam energy which penetrates to a depth).

No additional lasers or scanner apparatus are required. Whilst a continuous wave laser was experimentally used it is expected that the same principles described here may be applied to a pulsed laser.

Step 3: Layer by layer Component Build Up

The selected scan speed and spacing are then used to build a part on a layer by laser basis. As is well known in this field a substrate in the form of a substantial base plate is required to resist mechanical relaxation of the parts during and after building (which would otherwise cause mechanical distortion). Only small parts (e.g. dental copings and crowns) and certain stress balanced geometries (e.g. cylinders, balls etc.) can be made without significant mechanical distortion introduced by this stress that immediately follows the resolidification of powder to formed part.

In general, therefore, all parts require restraining to a mechanically strong and removable structure—the baseplate. For a standard 250×250 build size this base plate is typically 36 mm thick and weighs around 18 kg. For large parts thicker baseplates are used to avoid unacceptable mechanical distortion.

In addition metal powders when melted require wetting to a solid surface to form a part—otherwise they bead up under surface tension. It is therefore not possible to form a part by melting metal powders in a layer based process in the bed of powder without wetting each strip of each layer formed to an underlayer—be it the baseplate, an underlayer of the part being formed, or a support that is subsequently removed.

The metal thermally contracts as it resolidifies into a layer of the part and may also contract as it passes through a phase change as it cools. Where bulk heating to almost melting temperatures is not applied this cooling is immediately after solidification and on a layer by layer basis creates high levels of tensile stress. Cracking occurs where this stress exceeds the tensile strength of the material at that temperature. Ductile materials therefore are much less prone to cracking however generally the higher the ultimate tensile strength of the material the more crack prone it is.

For practical reasons the process of the invention does not apply significant powder bed heating. This enables the handling of the parts and powder bed immediately after completion of build and simplifies the building machinery. Heating of the powder bed is therefore generally to below 100° C. and primarily to speed the degassing of the powder and stabilise the process temperature. Preferably the temperature should be low enough to avoid significant cool down times prior to movement and handling of the parts build.

Step 4: Compressive Stress Treatment

Whilst the parts built are still restrained from mechanical relaxation—and thereby physical distortion—by their attachment to baseplate and support, their tensile stress is reduced and/or a compressive stress is added by any means other than bulk heating e.g. with a surface peening which puts some compressive stress into the surface. Experimentally it has been demonstrated that a compressed air blasting of the surface of the parts with a glass bead mesh size 36 is effective is crack reduction, though other methods, materials, and sizes will be effective as may be e.g. laser peening, detonation and other methods of creating an impact upon the surface of the part to impart compressive stress into the surface and/or remove at least some of the tensile stress in the as built part ahead of thermal processing. To facilitate this peening process, loosely adhering powder is first removed using e.g. by an alumina grit.

Step 5: Baseplate Mass Reduction

On completion of the building process the parts formed, that typically will weigh no more than 2 kg, are (literally) welded to their baseplate—that is typically made of tooling steel and is in excess of 20 kg. This makes rapid heating and cooling impracticable in subsequent heat treatments—yet until heat treatments are performed the part has significant stress and will mechanically distort. In this step of the process of the invention the base plate mass per part is minimised consistent with tolerable mechanical distortion prior to heat treatment. Where multiple parts have been made the base plate is cut around each part and optionally thinned by e.g. milling or drilled to reduce the mass of baseplate as far as possible. Experimentally base plates of 17.8 kg have been reduced to 0.4 to 1 kg, i.e. by approximately 95 to 98%.

Step 6: Hot Isostatic Press Treatment

A Hot Isostatic Press (HIP) process is then run. HIP equipment is highly specialised because of the temperatures and pressures involved and processes commercially available are limited. Therefore, a commercially useful process should preferably use a commercially available HIP processes.

Whilst the inventor believes as high a pressure as possible with as fast a heat up and cool down as possible is best, good results have been obtained from 4 hours at 140 MPa and 1260° C. for CM247LC with heat up and cool down rates of 8~15° C/minute. After HIP an inspection is preferably performed to check that acceptably low microcracking is present. An example of 'acceptable' is that no microcracks are visible in an optical microscope at ×100 magnification.

Step 7: Removal of Component from the Base Plate

The parts are now mechanically stable with all or at least most measurable stress removed. The remains of baseplate can now be removed without creating unacceptable mechanical distortion of the parts made. Preferably substantially all excess material (baseplate and support structures) from the parts is removed at this stage ahead of final heat treatment steps as are conventionally required or specified for the alloy. Final machining to high tolerance will however remain until after final heat treatments there is always some distortion as a result of heat treatment.

Step 8: Solution Heat Treatment

Nickel superalloys which are crack prone, and therefore particularly likely to benefit from the process of embodiments of invention, are typically solution heat treated and then precipitate hardened. The solution heat treatment used is any conventional heat treatment specified for the alloy. For example, in the case of CM 247LC a solution heat treatment of 2 hours at 1260° C. was used.

Step 9: Precipitate Hardening

An optional precipitate hardening ('aging') may be provided to provide improved mechanical properties. For example, a treatment of 871° C. for 20 hours was used in the case of CM 247LC.

What is claimed is:

1. A method of additive manufacturing a superalloy component, the method comprising the steps of:
   i. providing a powder bed of superalloy powder on a substrate;
   ii. scanning the powder with a laser to create a melt pool and thereby selectively fuse the powder into a desired shape, thereby forming a first layer of the component;
   iii. replenishing the powder bed and scanning the powder with the laser so as to form a subsequent layer of the component onto the first layer; and
   iv. repeating step (iii) as required until a final desired three dimensional component is formed;
   wherein scanning the powder with a laser comprises
   selective scanning of a focused laser beam across the surface of the powder bed in a line-by-line manner; and wherein
   the spacing between adjacent scan lines is no more than twice the layer thickness being formed.

2. The method of claim 1 wherein the laser is an Ytterbium doped fibre laser.

3. The method of claim 1, wherein the scan spacing is approximately 1.5 times the thickness of the layer being formed.

4. The method of claim 1, wherein the layer thickness is approximately 0.02 mm and the scan spacing is 0.03 mm.

5. The method of claim 1 wherein adjacent scan lines overlap.

6. The method of claim 5 wherein the scan lines overlap by between 60% and 90%.

7. The method of claim 1, wherein the laser scan speed is greater than 3 m/s.

8. The method of claim 1, wherein the laser dwell time is less than 40 μs.

9. The method of claim 1, wherein the scanning across the surface of the powder bed in a line-by-line manner is arranged to melt the selected areas of the powder to form a layer followed by at least two remelts of that layer by adjacent scans of the laser beam.

10. The method of claim 1, wherein the laser has a nominal spot size of no more than 0.1 mm.

11. The method of claim 1, wherein the method comprises the further step of applying a compressive stress treatment to the final three dimensional component.

12. The method of claim 1 wherein the method comprises a scan spacing distance no greater than a heat affected distance from the melt pool wherein that heat affected distance suppresses crack formation.

13. A method of additive manufacturing a superalloy component, the method comprising:
   i. providing a powder bed of superalloy powder on a substrate;
   ii. scanning the powder with a laser to form a melt pool and there selectively fuse the powder into a desired shape, thereby forming a first layer of the component;
   iii. replenishing the powder bed and scanning the powder with the laser so as to form a subsequent layer of the component onto the first layer; and
   iv. repeating step (iii) as required until a final three dimensional component is formed;
   wherein the method further comprises: applying a compressive stress treatment to the surface of the final three dimensional component prior to separation of the final three dimensional component from the substrate.

14. The method of claim 13, wherein the compressive stress treatment comprises mechanical impact or liquid or gaseous fluid transmitted impact.

15. The method of claim 13, wherein the method comprises the further step of treating the final three dimensional component prior to compressive stress treatment to remove loose powder.

16. The method of claim 13, wherein the method comprises the further step of Hot Isostatic Processing the final three dimensional component before separating the final three dimensional component from the substrate.

17. The method of claim 16 wherein the compressive stress treatment precedes the Hot Isostatic Processing.

18. The method of claim 16 wherein the mass of the substrate is reduced prior to the Hot Isostatic Processing.

19. The method of claim 18 wherein the mass of the substrate attached to any individual component is reduced by cutting the substrate around each component.

20. The method of claim 13, wherein the method comprises the further step of solution heat treatment of the final three dimensional component.

21. The method of claim 13, wherein the method comprises the further step of precipitate hardening of the final three dimensional component.

22. A method of additive layer manufacturing a superalloy component on a substrate including Hot Isostatic Processing wherein the mass of the substrate is reduced prior to the Hot Isostatic Processing.

23. The method of claim 22, wherein the mass of the substrate is reduced by at least 50%.

24. The method of claim 22, wherein the mass of the substrate is reduced by at least 95%.

25. The method of claim 22, wherein the mass of the substrate is reduced by milling or drilling.

* * * * *